US005772383A

United States Patent [19]

Kalika et al.

[11] Patent Number: 5,772,383

[45] Date of Patent: Jun. 30, 1998

[54] PIVOTAL MAIL TRAY UNLOADER

[75] Inventors: Joseph Kalika, Niles; David Fillcicchia, Schaumburg; Stelian Jurma, Arlington Heights; George Rabindran, Morton Grove; Mathai P. Easo, Des Plaines, all of Ill.

[73] Assignee: Bell & Howell Postal Systems Inc., Lincolnwood, Ill.

[21] Appl. No.: 729,348

[22] Filed: Oct. 16, 1996

[51] Int. Cl.[6] .................................................... B65G 65/23

[52] U.S. Cl. .......................... 414/403; 414/421; 414/769; 414/773; 414/778

[58] Field of Search .................................... 414/403, 413, 414/418, 421, 759, 760, 769, 773, 774, 775, 778, 790.2

[56] References Cited

U.S. PATENT DOCUMENTS 3,854,613 12/1974 Renfrow .................................. 414/421
3,863,789 2/1975 Hunter et al. ........................... 414/421
3,955,686 5/1976 Kumagai ................................. 414/759

*Primary Examiner*—James W. Keenan
*Attorney, Agent, or Firm*—Sonnenschein Nath & Rosenthal

[57] ABSTRACT

A pivotal mail tray unloader for unloading a tray having mail pieces horizontally stacked therein includes a frame having an elongated, inclined support surface, a carriage slidably mounted to the frame, and a retaining member slidably mounted to the frame. The carriage includes first, second and third pivotal support members. The first support member pivots upwardly and forwardly from said support surface and carries the tray thereon. The second support member is also pivotal upwardly and forwardly and is positioned adjacent to and forward of the first support member. The second member receives the tray from the first support member. The third support member is mounted to the second support member forward thereof and is adapted to receive the mail pieces thereon. The third support member pivots forwardly to receive the mail pieces and subsequently, pivots rearwardly to reorient the mail in a generally vertical orientation. A retaining member is slidably mounted to the frame and cooperates with the third support member to retain the mail in the generally vertical orientation.

15 Claims, 5 Drawing Sheets

PIVOTAL MAIL TRAY UNLOADER

FIELD OF THE INVENTION

This invention relates to a mail tray unloader. More particularly, the invention relates to a mail tray unloader having a multi-pivotal support carriage.

BACKGROUND OF THE INVENTION

Certain mail handling operations use crate-like trays for handling large pieces of mail, such as magazines and large format packages. Such trays have a bottom wall and four upstanding side walls, resembling a crate. Typically, such a tray has dimensions roughly about 20 inches long by 10 inches wide by 15 inches deep. The trays are rigid structures which are designed and fabricated to carry a relatively large amount of mail. It is not uncommon for such trays to be loaded with up to about 40 to 50 pounds of mail.

The trays are typically loaded with the mail in a horizontal orientation therein, with the first piece of mail laying flat on the bottom, and having the remaining mail stacked upward, on top of the first piece of mail. During the mail handling operations, however, the mail must be reoriented to an upstanding, vertical orientation for further handling and sorting.

In a typical mail handling operation, the unloading and reorienting of large format mail is performed manually. It will be recognized that such manual unloading and reorienting operations can be inefficient and time consuming. It is not uncommon for a mail handler to either pick individual pieces of mail from the tray, or to lean the tray over and empty all of the mail pieces from the tray at one time.

Given that a tray can be loaded with as much as 40 to 50 pounds of mail, the handler may be subject to injury if the handler attempts the leaning and emptying method of the removing the mail from the tray. Moreover, the leaning and emptying method, if done with undue care, may result in damage to the mail pieces.

Accordingly, there continues to be a need for a mail tray unloader, which facilitates unloading a tray and reorienting the mail within the tray. Such an unloader should be capable of handing large format pieces of mail such as magazines and the like. Preferably, such an unloader has actuating elements to facilitate and ease manipulating the mail tray.

SUMMARY OF THE INVENTION

A mail tray unloader for unloading mail from a mail tray includes a frame having an elongated support surface, a carriage slidably mounted to the frame, slidable along the surface, and a retaining member slidably mounted to the frame. The unloader is configured to receive the tray and pivotally unload the tray and reorient the mail from within the tray into a generally horizontal stack of vertically oriented mail pieces.

The support surface is upwardly inclined in the direction of mail travel at an angle of about 8° relative to the horizontal, and defines a mail travel path. In a preferred embodiment, the support surface has a plurality of moving belts which move forwardly, in the direction of mail travel.

The carriage is slidable along a rail mounted to the frame. The carriage includes first, second and third support members. The first support member is pivotal forwardly from the support surface about 75° between an orientation generally coplanar with the support surface and an orientation generally transverse thereto. The first support member is adapted to receive the tray with a bottom wall thereon, and rotate the tray about 75° as the first support member is pivoted.

The second support member is positioned adjacent to and forward of the first support member. The second support member is pivotable about 66° between an orientation generally coplanar with the support surface and an orientation generally transverse thereto. The second support member is adapted to receive the tray from the first support member, with a leading wall of the tray on the second member, and rotate the tray about 66° as the second member pivots. Forward pivoting of the second member positions the bottom of the tray generally upwardly to empty the mail from the tray.

The third support member is positioned forward of, adjacent and generally transverse to the second support member. The third support member is pivotable with the second member between an orientation generally transverse to the support surface and an orientation about 24° relative to the support surface. The third member is configured to receive the mail against it as the second and third members are rotated and the mail falls from the tray.

In a preferred embodiment, the third support member is formed from a plurality of plate-like elements having a fan-like configuration. The fan-like configuration pivots about an axis of rotation which is parallel to the mail travel path. The fan-like folding configuration permits the third member to be moved or folded out of the mail travel path and thus out of the way of the mail traveling along the path.

The retaining member is mounted to the frame and slidable along the frame in a first direction parallel to the mail travel path. The retaining member is also rotatable, in a direction generally perpendicular to the first direction. The retaining member is configured to cooperate with the third support member to retain the vertically stacked mail between the third member and the retaining member, and is further adapted to slidingly move along said frame with the stacked items thereon. The retaining member is operably connected to a moving belt which moves forwardly at the same rate as the support surface belts to advance the mail which is resting thereon.

In a preferred embodiment, the first and second support members include actuators operably connected thereto to facilitate pivoting the members with the tray thereon. Preferably, the actuators are pneumatic-type piston cylinders. The third member may include a rotary-type actuator for folding or pivoting the plate-like elements from the mail travel path and out of the way of the mail.

In a most preferred embodiment, the first support member includes a base portion from which it pivots and a plurality of elongated, rigid support elements extending from the base portion. The support member may include a lip, formed of a plurality of relatively short projecting elements extending from the base portion generally perpendicular to the support elements. The lip facilitates retaining the tray on the first support member as the support member and the tray are rotated. The second support member may include openings formed therein which are adapted to accommodate the projecting elements, to permit independently pivoting the first and second support members.

Preferably, the retaining member includes a support arm and a plurality of depending retaining elements depending from the support arm. The retaining elements are adapted to cooperate with the first support member support elements to permit independent movement of the first member and the retaining member without interfering with one another.

The unloader may include sensors mounted thereto to detect, for example, the presence of a tray on the carriage, the position of the carriage along the support surface and the passage of the retaining arm beyond the first support member. The unloader may also include feedback sensors on the actuators to detect the position or state of the actuator (i.e., the extended or retracted state). The sensors can provide signals to a control system to facilitate automatic control of the unloader.

In a most preferred embodiment, the unloader includes a front tray feeder having a roller conveyor and a pneumatically actuatable inclining feed surface. The tray feeder can be positioned so as to automatically feed trays into the unloader.

Other features and advantages of the present invention will be apparent from the following detailed description, the accompanying drawings, and the appended claims.

DETAILED DESCRIPTION OF THE PREFERRED EMBODIMENTS

Figure 1:
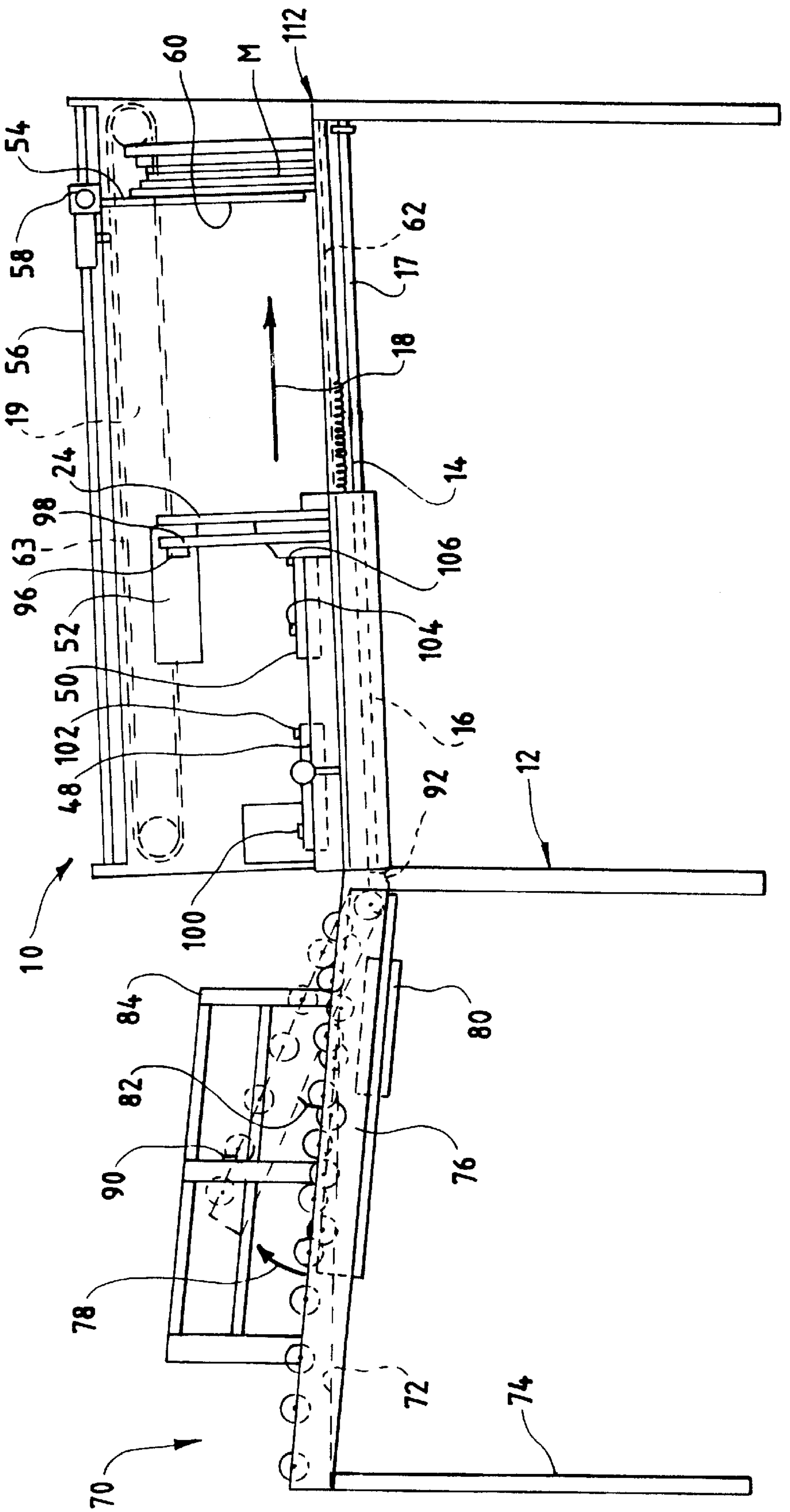
FIG. 1 is a front, elevational view of mail tray unloader embodying the principles of the present invention, the unloader being illustrated with a front tray feeder, and showing various mail pieces at the discharge end of the unloader support surface.
Figure 2:
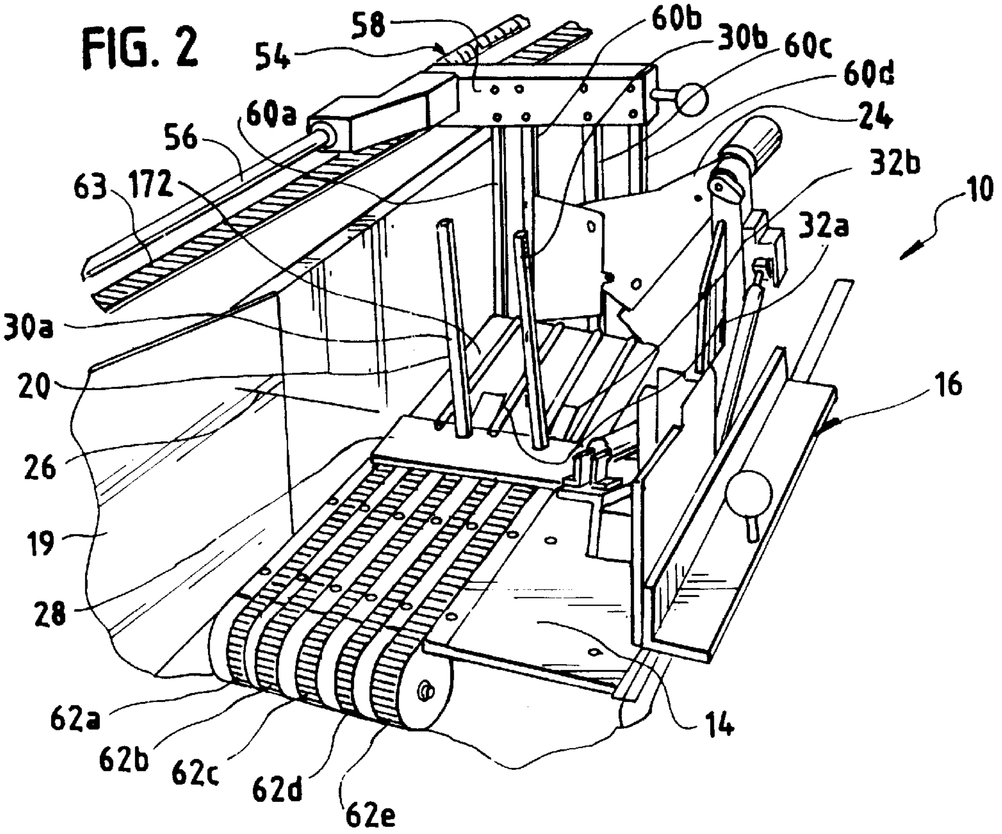
FIG. 2 is a perspective illustration of the mail tray unloader of FIG. 1, being shown with the first support member thereof in the forwardly pivoted position, and further illustrated with a plurality of moving belts positioned on the support surface.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

With reference now to the figures and in particular to FIG. 1, there is shown a pivotal mail tray unloader 10 in accordance with the principles of the present invention. The unloader 10 includes, generally, a frame 12 having an elongated, inclined support surface 14 and a carriage 16. The support surface 14 defines a mail travel path 18. The support surface 14 is inclined upwardly along the mail travel path 18 at an angle of about 8° relative to the horizontal. The unloader 10 is adapted to receive a mail tray T on the carriage 16, and to unload and reorient the mail M which is in the tray T. The mail M is unloaded and reoriented onto the support surface 14. A rear plate 19 extends upwardly from the support surface 14.

Figure 9:
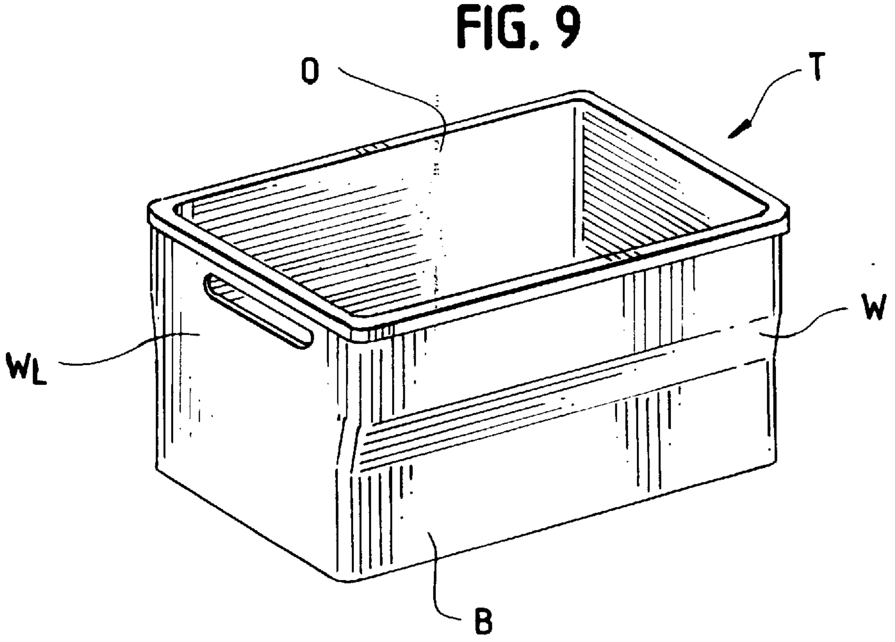
FIG. 9 is a perspective view of an exemplary mail tray which is used with the present unloader.

The unloader 10 may be used for unloading most mail trays T. The unloader 10 is particularly useful for unloading mail trays T which are used for holding or containing large format mail pieces, such as magazines, books and the like, such as the exemplary tray T illustrated in FIG. 9. Typically, such a large format mail tray T resembles a crate. The tray T is rigid, and has a bottom wall B, four upstanding side walls W, and an open top O.

Mail trays T are generally formed of relatively common plastic materials which are light-weight, yet sufficiently strong to support large loads. It is not uncommon for a mail tray T of the type illustrated to be loaded with as much as 40 to 50 pounds of mail. A mail tray T typically has dimensions about 20 inches long by 10 inches wide by 15 inches deep.

The unloader carriage 16 is configured to receive a mail tray T and rotate the tray T about 140° relative to the support surface. The mail M falls from the tray T, and the tray T is removed from the unloader 10. The mail M can then be reoriented into a generally horizontal stack of vertically oriented mail pieces M for further handling.

The carriage 16 is slidable along the frame 12, above the support surface 14 in the direction of travel of mail, as indicated by the arrow at 18. The carriage 16 slides along a rail 17 that is mounted to the frame 12 below the support surface 14. A biasing element, such as the exemplary coil spring may be mounted to the frame 12 and to the carriage 16 to facilitate sliding the carriage 16 along the surface 14, in the direction of the mail travel path 18. The terms forward and forwardly refer to travel and/or orientation in the direction of travel of the mail pieces in the unloader 10, along the mail travel path 18.

Figure 3:
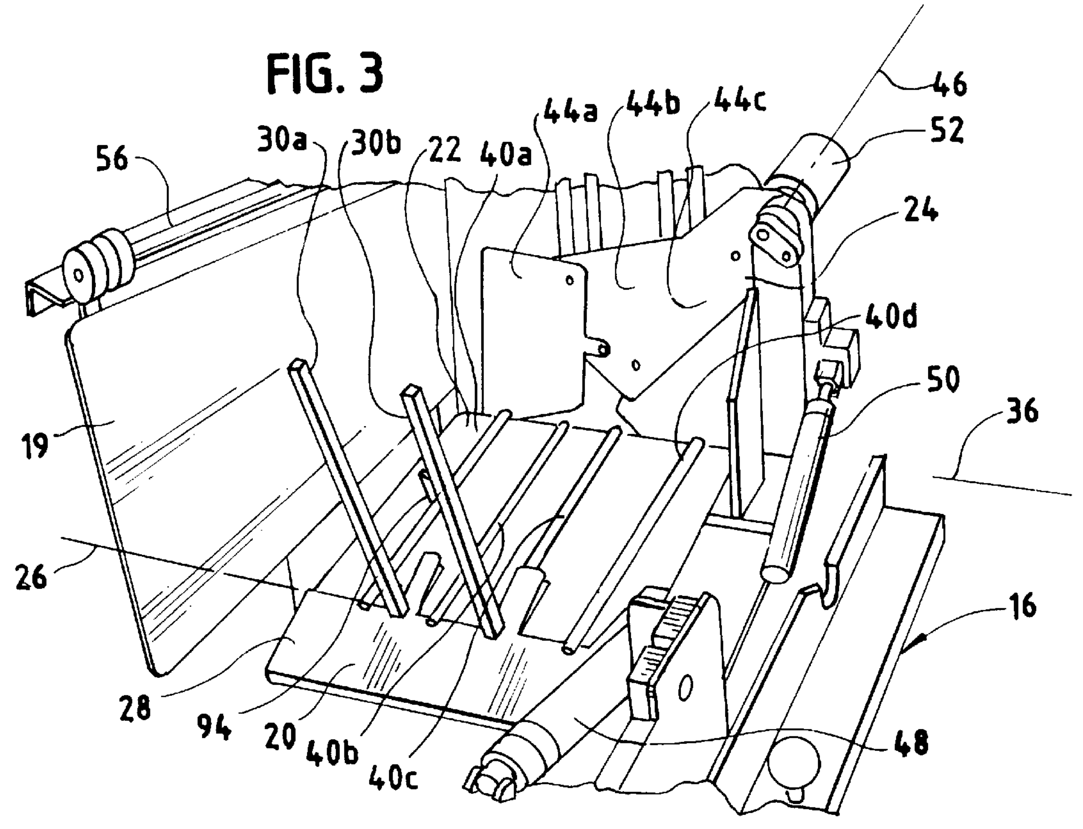
FIG. 3 is a partial perspective view of the mail tray unloader of FIG. 1, illustrated with the first support member pivoted forwardly into an upright position, the unloader being illustrated without the moving belts for clarity of illustration.
Figure 4:
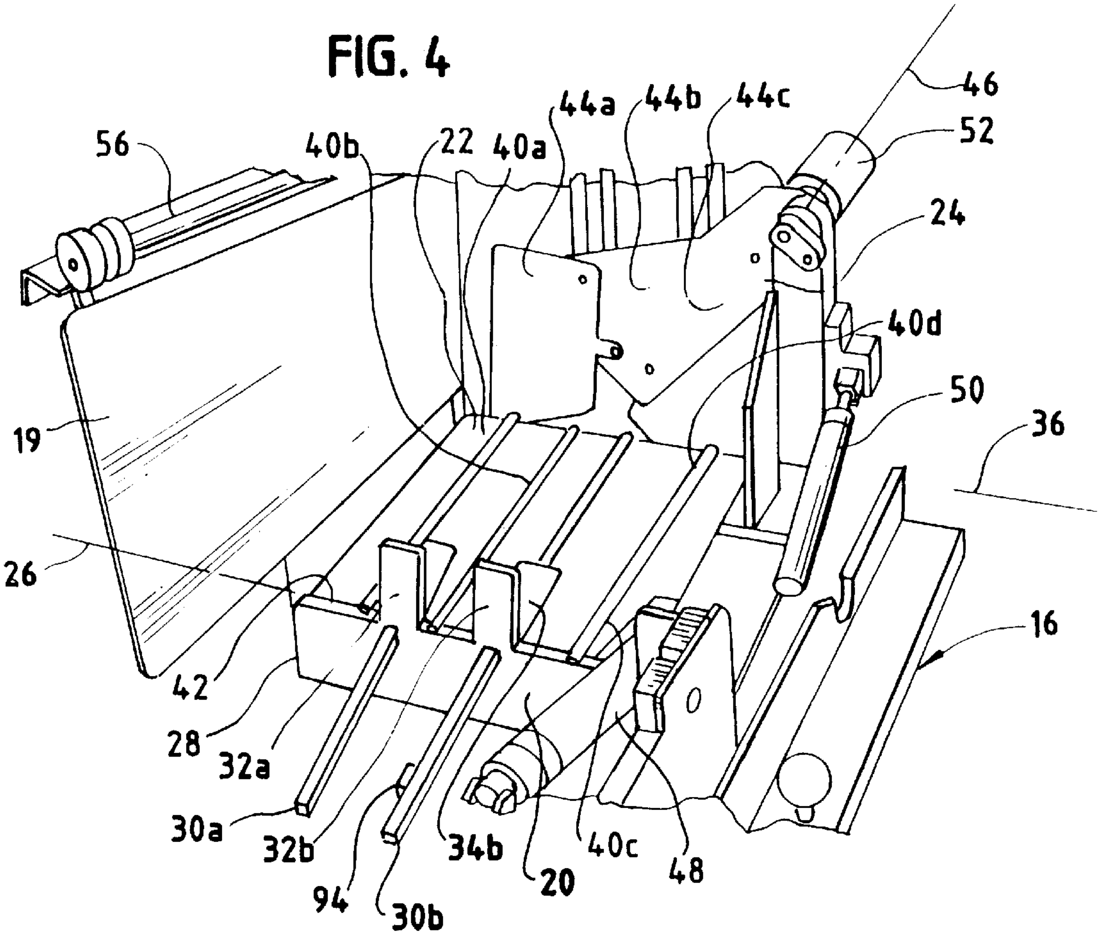
FIG. 4 is a partial perspective view similar to FIG. 3, illustrating the first support member rotated rearwardly, in position to receive a mail tray.
Figure 5:
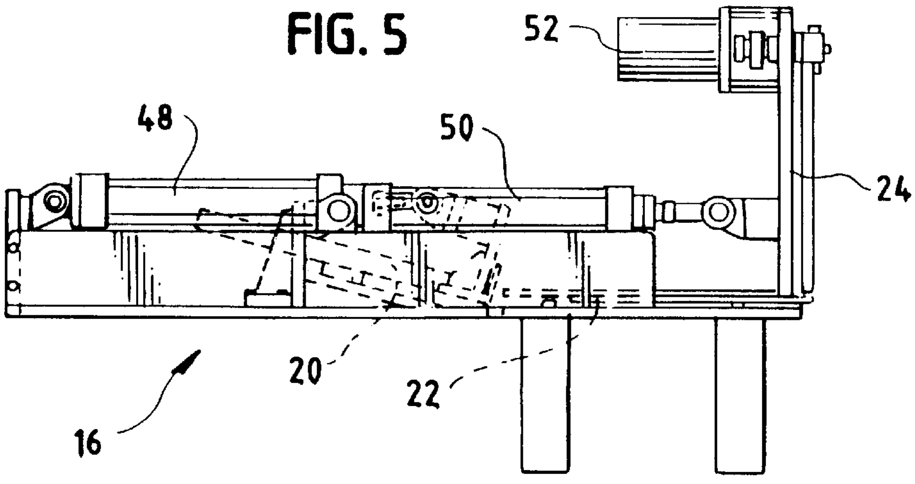
FIG. 5 is a front elevational view of the unloader carriage.
Figure 6:
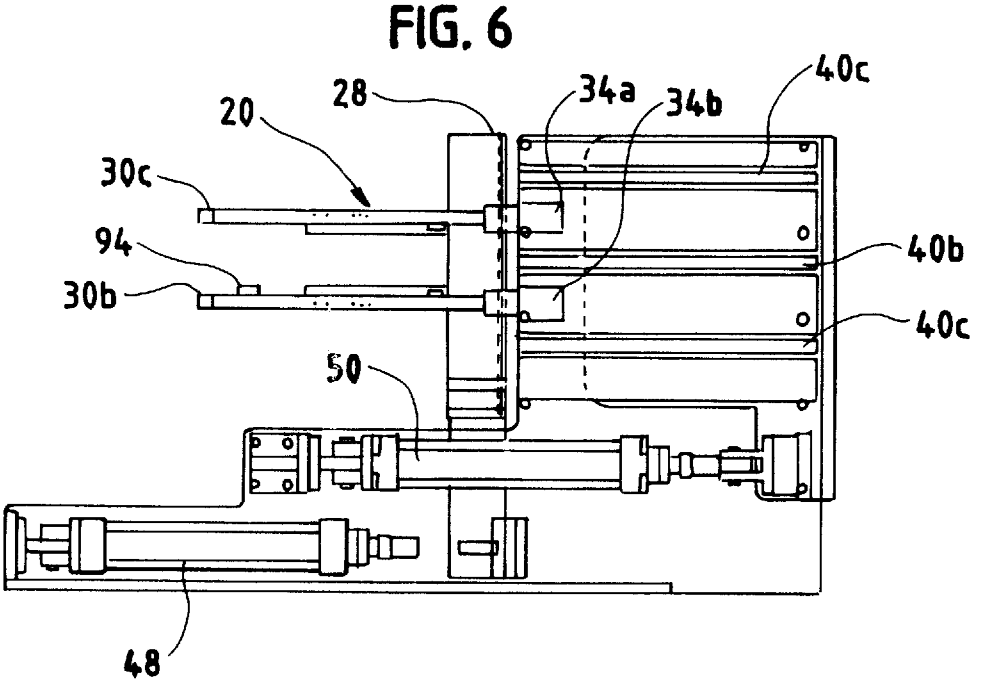
FIG. 6 is a top view of the unloader carriage, illustrated with the first support member in the rearwardly pivoted position, ready to receive a mail tray thereon.
Figure 7:
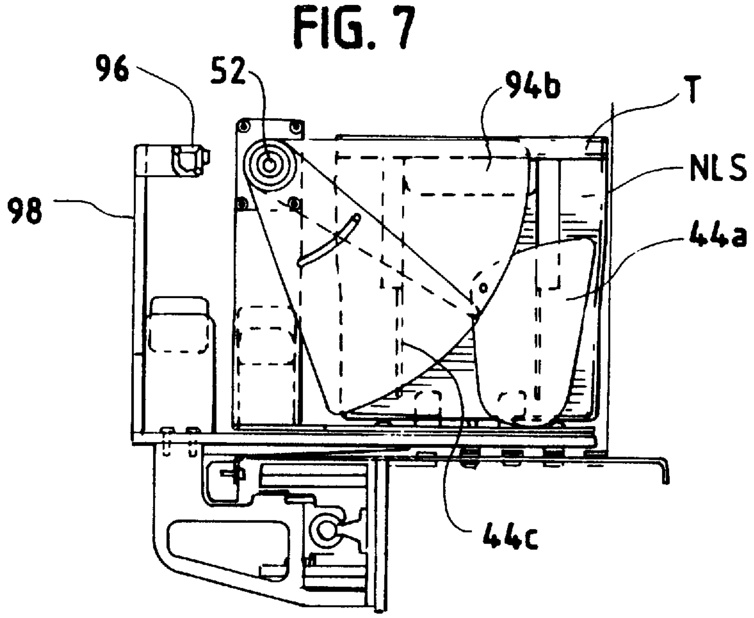
FIG. 7 is a side elevational view of the unloader carriage, showing the third support member in the unfolded state.
Figure 8:
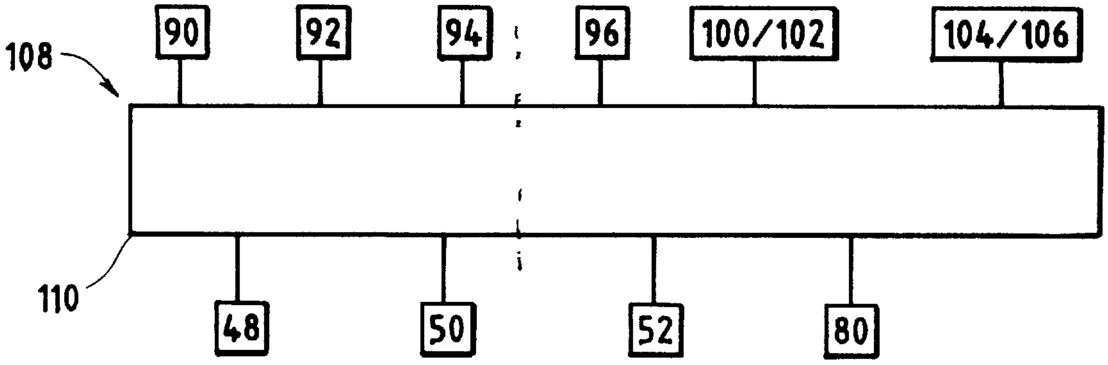
FIG. 8 is a block diagram of an exemplary control system for the unloader.

The carriage 16 includes first, second and third pivotal support members 20, 22 and 24. The first support member 20 is mounted to the carriage 16 and is pivotal about an axis of rotation, indicated by the arrow at 26, which extends generally transverse to the support surface 14. The first support member 20 pivots upwardly from the surface 14, in the direction of the mail travel path 18, along the unloader 10, i.e., upwardly and forwardly. Preferably, the first support member pivots about 75° between the rearward orientation which is best seen in FIG. 4 and the forward orientation which is best seen in FIG. 3.

In a preferred embodiment, the first support member 20 has a base portion 28, and includes a plurality of elongated, rigid support elements 30*a,b* which extend from the base portion 28. The first support member 20 may include a lip 32 extending from the base 28, in a plane generally perpendicular to the support elements 30*a,b*. Preferably, the lip 32 is formed of a plurality of relatively short projecting elements 32*a,b*. The elements 32*a,b* complement and fit within respective notches or openings 34*a,b* in the second support member 22. The first support member 20 is configured to receive the tray T with the bottom wall B of the tray T resting thereon, and to rotate the tray T about 75° to position the leading side wall $W_L$ downward.

The second support member 22 is mounted to the carriage 16 adjacent to and forward of the first support member 20. The second support member 22 is also pivotal about an axis of rotation, indicated by the arrow at 36, which extends generally transverse to the support surface 14. The second support member 22 pivots from the surface 14, upwardly, in the direction of the mail travel path 18, along the unloader 10, i.e., upwardly and forwardly. The second support member 22 pivots about 66° between the rearward orientation and the forward orientation.

In a preferred embodiment, the second support member 22 has a base portion 38, and includes a plurality of low friction elements 40*a–d* mounted thereto. The low friction elements 40*a–d* facilitate manipulating the tray T when it is positioned on the second support member 22. As provided previously, the second support member 22 includes a plurality of openings therein 34*a,b*, at a leading edge thereof 42, which are adapted to accommodate the projecting elements 32*a,b* of the first support member 20. The elements 32*a,b* and openings 34*a,b* cooperate so as to permit the first and second support members 20, 22 to rotate independently of one another without interfering with each other.

The second support member 22 is configured to receive the tray T from the first support member 20, with the leading side wall $W_L$ of the tray T resting thereon, and to further rotate the tray T about 66° to position the open top O of the tray T in a generally downward orientation. It will be recognized that in this orientation, the bottom wall B of the tray is oriented generally upwardly, and the mail M falls from the tray.

The unloader 10 includes a third support member 24 mounted to the carriage 16 integral with and generally forward of the second member 22. The third support member 24 is mounted to the second support member 22, generally perpendicular thereto, and pivots with the second support member 22. The third support member 24 is adapted to cooperate with the second member 22 and to receive and support the mail pieces M thereon as they fall from the tray T, when the tray T and the members 22, 24 are pivoted.

In a preferred embodiment, the third support member 24 is formed of a plurality of plate-like elements 44*a–c* having, in part, a fan-like folding configuration. The fan-like elements 44*a–c* fold or pivot about an axis, indicated by the arrow at 46, above, and in spaced relation to the support surface 14. The axis of rotation 46 of the fan-like elements 44*a–c* is generally parallel to the support surface 14 when the third support member 24 is in an upright position. The fan-like elements 44*a–c* pivot transversely away from the mail travel path 18, and consequently, out of the way of mail M traveling along the mail path 18.

In a most preferred embodiment, the first support member 20 has an actuator 48 operably connected thereto to assist in pivoting the member 20. Similarly, the second support member 22 has an actuator 50 operably connected thereto to assist in pivoting the second and third support members 22, 24. The third support member 24 includes an actuator 52 to assist in fan-folding the plate-like elements 44*a–c*. Preferably, actuators 48 and 50 are of the reciprocating type, such as pneumatic cylinder-type actuators. The third support member actuator 52 is preferably a rotary-type actuator.

The unloader 10 includes a retaining member 54 which is slidably mounted to the frame 12, and is slidable in the direction of the mail travel path 18. The retaining member 54 is slidable along a 56 rail which is mounted parallel to, above, and in spaced relation to the support surface 14. The retaining member 54 is slidable independent of the carriage 16.

The retaining member 54 is further pivotal about the rail 56, generally transverse to the mail travel path 18. The pivotal arrangement permits the retaining member 54 to be pivoted upwardly, out of the mail travel path 18 and away from the carriage 16. Conversely, the retaining member 54 can be pivoted downward to cooperate with the carriage 16 in advancing the mail M along the mail travel path 18 when the mail M is vertically oriented.

The retaining member 54 is configured to cooperate with the third support member 24 to retain the mail pieces M between the support member 24 and the retaining member 54, as discussed in detail herein. In a preferred embodiment, the retaining member 54 includes a support arm 58 and a plurality of depending retaining elements 60*a–d* depending from the support arm 58.

When used in a typical mail handling operation, the support surface 14 includes one or more traveling belts, such as the belts 62*a–e*. The traveling belts 62*a–e* facilitate moving the mail M through the unloader 10 as it is unloaded from the tray T and reorienting the mail M into a vertical array. The traveling belts 62*a–e* also advance the mail M along the unloader 10, away from the carriage 16, for subsequent handling and sorting.

In the typical arrangement, the retaining member 54 is operably connected to a moving belt 63 to advance the retaining member 54 along with the support surface belts 62*a–e*. The retaining member 54 can be disengaged from the moving belt 63 by pivoting it upwardly, to move the member 54 independently of the belt 63.

In the illustrated embodiment, the unloader 10 includes a front tray feeder 70. The feeder 70 is configured to move trays T therethrough and position the trays T on the carriage 16, on the first support member 20. In a current embodiment, the feeder 70 includes a gravity feed roller conveyor 72 mounted to a frame 74. The conveyor 72 surface is inclined at an angle of about 7° relative to the horizontal, to feed the trays T by gravity into the carriage 16. The tray feeder 70 includes an actuated inclining surface 76 which inclines toward the carriage 16 as indicated by the arrow at 78, to feed the trays T to the carriage 16.

In a preferred embodiment, the inclining surface 76 is actuated by a pneumatic cylinder 80 to raise the surface 76. The conveyor 72 includes stops 82 thereon which are adapted to stop trays T from entering onto the carriage 16 without the inclining surface 76 having been raised. The feeder 70 may include aligning rails 84 to prevent trays T from falling from the conveyor 72 and to maintain the trays T aligned therewith.

The unloader 10 may include sensors thereon which facilitate automatic operation of the unloader 10 system. In a current embodiment, the unloader 10 includes a sensor 90 positioned on the tray feeder section 70 to detect the presence or absence of a tray T in the feeder section 70. A sensor 92 positioned on the frame 12, below the support surface 14, senses whether the carriage 16 is in the home position, that is, whether the carriage 16 is at the end of the support surface 14 adjacent to the tray feeder 70. A sensor 94 positioned on one of the rigid support elements 30*a,b* of the first support member 20 detects whether the retaining member 54 has been advanced past the support member 20. A sensor 96 positioned on a sensor post 98, adjacent to the third support member 24, detects the absence or presence of a tray T in the carriage 16 when the second and third support members 22, 24 have been fully pivoted forward.

The unloader 10 may further include feedback sensors 100, 102, 104, 106 positioned on the actuators 48, 50 to detect the position, i.e., extended or retracted, of the air cylinder pistons. The sensors may by connected to a control system 108, that includes a controller 110, to facilitate automatic operation of the unloader 10.

In use, a tray T positioned on the tray feeder 70 advances toward the carriage 16 by gravity. The tray T is prevented from advancing onto the carriage 16 by the stops 82 positioned on the conveyor 72. Sensor 90 detects the presence of a tray T in the feeder 70, and sensor 92 detects whether the carriage 16 is in the home position. When the carriage 16 is in the home position and the first support member 20 is pivoted rearwardly, actuator 80 is actuated which raises the inclining surface 76 and advances the tray T onto the first support member 20.

The tray T advances onto the first support member 20, with the juncture of the leading side wall $W_L$ and the bottom B abutting the lip 32. The lip 32 retains the tray T on the first support member 20 as it is rotated, and prevents the tray T from slipping from the support member 20.

The actuator 48 is actuated, and the first support member 20 is pivoted upwardly to position the leading side wall $W_L$ on the second support member 22. As the tray T is rotated onto the second support member 22, the mail M is reoriented into a generally vertical orientation within the tray T, resting on the leading side wall $W_L$ thereof. When the tray T is thus positioned on the second support member 22, the third support member 24 is positioned across the open top O of the tray T.

The actuator 50 is actuated, and the second and third support members 22, 24 are pivoted forward. The mail M in turn, falls forward against the third support member 24. The mail M is now oriented at an angle of about 24° relative to, and above the support surface 14. The bottom B of the tray T is oriented generally upward. With the mail M resting against the third support member 24, the tray T can be removed from the unloader 10, and the mail M remains in the unloader 10, with the mail M resting against the third support member 24.

When the tray T has been removed, sensor 96 generates a signal which actuates actuator 50 in the reverse direction. Reversal of the actuator 50 pivots the second and third support members 22, 24 rearwardly. As the support members 22, 24 are pivoted rearwardly, the mail M is reoriented into a horizontal stack of vertically oriented mail pieces. The reoriented mail M rests on the second support member 22, and is held in place between the first and third support members 20, 24. The carriage 16 is then slid forwardly toward the discharge end 112 of the unloader 10, up to about the retaining member 54.

The retaining member 54 is pivoted upwardly and is positioned rearwardly of the first support member 20. The retaining member 54 is then advanced forwardly against the mail pieces M. The retaining member 54 retaining elements 60*a–d* and the first support member 20 support elements 30*a,b* are positioned so as to permit the retaining member 54 to slide past the support member 20 without their respective elements 60*a–d*, 30*a,b* interfering with one another.

As the retaining member 54 is advanced past the support member 20, sensor 94 senses that the retaining member 54 has moved past, and actuates actuator 52 which in turn folds or pivots the third support member 24 out of the mail travel path 18, and out of the way of the mail M.

The mail pieces M are then slid off of the second support member 22 with the retaining member 54 in place rearwardly of the stack of mail pieces M. The mail M can then be advanced along the traveling belts 62*a–e*, and the carriage 16 repositioned at the front end of the unloader 10.

When the carriage 16 is returned to the home position, sensor 92 detects the presence of the carriage 16 and resets the unloader 10 to receive a subsequent tray T. The carriage 16 is reset by unfolding the third support member 24 and by pivoting the first support member 20 to the rearward position.

As provided above, the support surface 14 is inclined upwardly at an angle of about 8° relative to the horizontal. The upward incline facilitates retaining the mail M in a generally vertical orientation with the retaining member 54 only, after the carriage 16 is removed, as the mail M travels along the support surface 14. The upward incline is further configured to reduce the tendency of the mail M to fall from the mail tray T during the rotational steps, and in particular, as the second support member 22 is rotated upwardly. The support surface may also be inclined downwardly toward the rear plate 19 to reduce the tendency for mail M to fall outward from the unloader 10.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A tray unloader for unloading an associated mail tray, the tray having a bottom wall and upstanding side walls defining an open top, one of the side walls being a leading wall, the tray being configured for receiving therein a plurality of horizontally oriented, stacked items, the unloader being adapted to receive the tray and pivotally unload the tray and to reorient the items therein to a generally vertical orientation, the unloader comprising:

- a frame having an elongated, inclined support surface defining a mail travel path;
- a carriage slidably mounted to said frame, the carriage having
  - a first support member pivotal forwardly from said support surface about 75° between an orientation generally coplanar with said support surface and an orientation generally transverse thereto, said first support member adapted to receive the tray with the bottom wall thereon, and rotate the tray about 75° therewith;
  - a second support member pivotal from said support surface, said second support member being adjacent to and forward of said first support member, said second support member being pivotable about 66° between an orientation generally coplanar with said support surface and an orientation generally transverse thereto, said second support member adapted to receive the tray with the leading wall thereon, and rotate the tray about 66° therewith;
  - a third pivotal support member adjacent to and pivotal with said second support member, said third support member being forward of said second support member, said third support member being pivotable about 66° from an orientation generally transverse to said support surface, said third support member being formed from a plurality of plate-like elements having a fan-like configuration pivotal about an axis of rotation parallel to said mail travel path and in spaced relation with said support surface, said third support member being adapted to support thereagainst the stacked items in a generally vertical orientation, rotate forward about 66° to reorient the stacked items in a generally transverse orientation, and subsequently rotate rearward about 66° to reorient the stacked items in the generally vertical orientation; and
- a retaining member mounted to said frame and slidable along said frame in a first direction parallel with said mail travel path, said retaining member being rotatable in a direction generally perpendicular to said first direction, said retaining member being configured to cooperate with said third support member to retain the stacked items therebetween when said items are in a generally vertical orientation, and further adapted to slidingly move along said frame with the stacked items thereon.

2. The tray unloader of claim 1 wherein said support surface includes at least one traveling belt configured to move in a direction of the mail travel path.

3. The tray unloader of claim 2 further including a second traveling belt operably connected to said retaining member and adapted to advance said retaining member at a rate of speed about equal to said at least one support surface belt.

4. The tray unloader of claim 1 further including an actuator operably connected to one of said first and second support members.

5. The tray unloader of claim 4 further including a second actuator operably connected to the other of said first and second support members.

6. The tray unloader of claim 1 wherein said first support member includes a base portion and a plurality of rigid support elements extending from said base portion.

7. The tray unloader of claim 6 wherein said first support member includes a lip extending from said base portion generally perpendicular to said support elements, said lip being formed of a plurality of relatively short projecting elements, and wherein said second support member defines a plurality of openings therein adapted to receive said projecting elements, for independently pivoting said first and second support members.

8. The tray unloader of claim 1 including a plurality of sensors positioned thereon, at least one of said sensors being adapted to generate a signal in response to the presence of a tray positioned at a selected region of said unloader, and including a controller configured to receive said signal and generate a control signal in response thereto for controlling at least one of said actuators.

9. The tray unloader of claim 1 including a plurality of sensors positioned thereon, at least one of said sensors being adapted to generate a signal in response to the presence of said carriage at a home position, and including a controller configured to receive said signal and generate a control signal in response thereto for controlling at least one of said actuators.

10. The tray unloader of claim 1 including a tray feeder section adapted to feed the tray into the unloader, the tray feeder including a roller conveyor and having an actuatable inclining surface pivotally mounted thereto for advancing the tray thereralong.

11. The tray unloader of claim 10 wherein said tray feeder includes a sensor mounted thereto configured to detect the presence of a tray therein and generate a signal in response thereto, and further including a sensor adapted to generate a signal in response to the presence of said carriage at a home position, and including a controller configured to receive said signals and generate a control signal in response thereto for actuating at least an actuator operably connected to said inclining surface.

12. A tray unloader for unloading an associated mail tray, the tray having a bottom wall and upstanding side walls defining an open top, one of the side walls being a leading wall, the tray having therein a plurality of horizontally oriented, stacked items, the unloader being adapted to receive the tray and pivotally unload the tray and to reorient the items therein to a generally vertical orientation, the unloader comprising:

a first frame section adapted to support a tray feeder, said tray feeder having an inclined roller conveyor and an inclining surface;

a second frame section adapted to support a support surface having first and second inclines, said first incline being upward and defining a mail travel path along said support surface, said support surface having at least one movable belt thereon, movable along said mail travel path, said second incline being generally transverse to said first incline;

a carriage slidably mounted to said frame and slidable in a direction along said mail travel path, said carriage having first, second and third pivotal support members, said first support member being pivotal upwardly from said support surface about 75° relative thereto along said mail travel path, said second and third support members being integral with one another and being pivotal upwardly from said support surface about 66° relative thereto along said mail travel path, said first support member being pivotal independently of said second and third support members, said third support member being further pivotal transverse to said mail travel path, said carriage being configured to receive the mail tray thereon and rotate the mail tray thereon;

a retaining member slidably mounted to said second frame section and cooperative with said carriage, said retaining member being slidable in a first direction parallel to said mail travel path and being pivotal transverse to said first direction, said retaining member being engageable with a second movable belt traveling at a rate of speed about equal to said at least one support surface movable belt, wherein said carriage is pivotable to rotate the mail tray positioned thereon to discharge the stacked items therefrom and orient the stacked items in a generally vertically oriented, generally horizontal array, said retaining member cooperating with said carriage to discharge the stacked array from said carriage onto said at least one support surface movable belt.

13. The tray unloader of claim 12 wherein each said first, second and third support members are operably connected to a respective actuator configured to pivot its respective support member, and wherein said inclining surface is operably connected to an actuator configured to incline said surface.

14. The tray unloader of claim 13 including sensors thereon configured to detect, and generate a signal in response to at least one of the presence of the tray on the inclining surface, the position of said carriage relative to said support surface, and the presence of a tray in said carriage when said second and third support members are pivoted forwardly.

15. The tray unloader of claim 14 further including a control system configured to receive said signal and generate a control signal in response thereto for controlling at least one of said actuators.

* * * * *